United States Patent
Gibson et al.

(10) Patent No.: US 11,998,002 B2
(45) Date of Patent: Jun. 4, 2024

(54) CRYOPRESERVING PROCESSES

(71) Applicant: UNIVERSITY OF WARWICK, Coventry (GB)

(72) Inventors: Matthew Gibson, Coventry (GB); Christopher Stubbs, Coventry (GB); Trisha Bailey, Coventry (GB)

(73) Assignee: UNIVERSITY OF WARWICK, Coventry (GB)

( * ) Notice: Subject to any disclaimer, the term of this patent is extended or adjusted under 35 U.S.C. 154(b) by 871 days.

(21) Appl. No.: 16/981,421

(22) PCT Filed: Mar. 15, 2019

(86) PCT No.: PCT/GB2019/050730
§ 371 (c)(1),
(2) Date: Sep. 16, 2020

(87) PCT Pub. No.: WO2019/175596
PCT Pub. Date: Sep. 19, 2019

(65) Prior Publication Data
US 2021/0007349 A1 Jan. 14, 2021

(30) Foreign Application Priority Data
Mar. 16, 2018 (GB) ...................... 1804233

(51) Int. Cl.
*A01N 1/02* (2006.01)

(52) U.S. Cl.
CPC .................. *A01N 1/0221* (2013.01)

(58) Field of Classification Search
CPC ................................... A01N 1/0221
See application file for complete search history.

(56) References Cited

U.S. PATENT DOCUMENTS

| | | | |
|---|---|---|---|
| 4,033,772 A | 7/1977 | Sprung et al. |
| 5,134,198 A | 7/1992 | Stofko, Jr. et al. |
| 7,871,818 B2 | 1/2011 | Rozema et al. |
| 9,648,869 B2 | 5/2017 | Ben et al. |
| 2007/0259327 A1 | 11/2007 | Iwanaga et al. |

FOREIGN PATENT DOCUMENTS

| | | |
|---|---|---|
| EP | 1115281 A1 | 7/2001 |
| EP | 2305792 A1 | 4/2011 |
| GB | 1565359 A | 4/1980 |
| JP | 2012217342 A | 11/2012 |
| JP | 5630979 B2 | 11/2014 |
| JP | 2015149905 A | 8/2015 |
| JP | 2016220672 A | 12/2016 |
| WO | 2014034884 A1 | 3/2014 |
| WO | 2016195121 A1 | 12/2016 |
| WO | 2017156235 A1 | 9/2017 |

OTHER PUBLICATIONS

Taylor et al, Transfus Med Hemother 2019;46:197-215 (Year: 2019).*
Stubbs et al, Biomacromolecules 2020, 21, 7-17 (Year: 2020).*
Bailey, Trisha L., et al. "Synthetically scalable poly (ampholyte) which dramatically enhances cellular cryopreservation." Biomacromolecules 20.8 (2019): 3104-3114. (Year: 2019).*
Tomás, Ruben MF, et al. "Assay-ready cryopreserved cell monolayers enabled by macromolecular cryoprotectants." Biomacromolecules 23.9 (2022): 3948-3959. (Year: 2022).*
Stubbs et al "Regioregular Alternating Polyampholytes Have Enhanced Biomimetic Ice Recrystallization Activity Compared to Random Copolymers and the Role of Side Chain versus Main Chain Hydrophobicity", Biomacromolecules, vol. 18, No. 1, Dec. 23, 2016, pp. 295-302, XP55587789.
Mitchell et al "Rational, yet simple, design and synthesis of an antifreeze-protein inspired polymer for cellular cryopreservation", Chemical Communications, vol. 51, No. 65, Jan. 1, 2015, pp. 12977-12980, XP55422493.
International Search Report and Written Opinion issued in PCT/GB2019/050730, dated May 24, 2019.
Search Report from IPO issued in GB1804233.3, dated Sep. 18, 2018.
Scientific Opinion on the safety of "Methyl Vinyl Ether-Maleic Anhydride Copolymer" (chewing gum base ingredient) as a Novel Food ingredient, EFSA Journal 2013;11(10):3423.

* cited by examiner

*Primary Examiner* — Emily A Cordas
*Assistant Examiner* — Constantina E Stavrou
(74) *Attorney, Agent, or Firm* — Meunier Carlin & Curfman LLC

(57) ABSTRACT

The present invention relates to processes for producing compositions for the cryopreservation of biological materials, e.g. cells and proteins. The compositions comprise a polyampholyte polymer. The invention also provides certain cryopreserving compositions comprising the polyampholyte polymer.

13 Claims, 10 Drawing Sheets

CRYOPRESERVING PROCESSES

The present invention relates to processes for producing compositions for the cryopreservation of biological materials, e.g. cells and proteins. The compositions comprise a polyampholyte polymer. The invention also provides certain cryopreserving compositions comprising the polyampholyte polymer.

Cryopreservation is a common method for storing biological material in an inactive state over prolonged periods of time. One issue in the field of cellular cryopreservation is ice crystallization and recrystallization after freeze-thaw cycles; this leads to reduced viability of cells. There are a number of ways that have been developed in order to maintain cell survival: these include the use of organic solvents DMSO or glycerol, and the use of ice recrystallization inhibitors (IRIs) such as polyvinyl alcohol (PVA), hydroxyethyl starch (HES) and polyvinylpyrrolidone (PVP).

The storage and transport of frozen human cells is vital for the development and delivery of cell-based therapies. Due to the multitude of cell types, cryoprotection can be complex. Developing a cryoprotectant which can be used universally on various cells would simplify and enhance the area, especially if the universal cryoprotectant has properties such as better cell survival or reduced toxicity. Such a solution may improve the logistics of cell therapies and transfusion medicine. In particular, in blood transfusion medicine, having a higher percentage of viable cells may enable lower volumes to be required for transfusions.

Processes of using a macromolecular polyampholyte have now been developed which provide red blood cell recovery rates (post-freezing) of over 80%. This is comparable with glycerol cryoprotective rates and this exceeds current macromolecular-cryoprotectant cell recoveries (which are approx. 60%). This macromolecular polyampholyte may be used with a wide variety of different cell types, including nucleated cells.

The macromolecular polyampholyte may be derived from poly(methylvinyl ether-aft-maleic anhydride), which is commercially sold as Gantrez SF. Gantrez SF is widely used in the food and pharmaceutical industries, and as a bioadhesive. The macromolecular polyampholyte may be made simply from Gantrez SF by esterification with a hydroxyl-functional tertiary amine. This simple reaction of two known molecules provides a cost-effective and easily scalable process for the preparation of the macromolecular polyampholyte.

U.S. Pat. No. 4,033,772 discloses the use of the macromolecular polyampholyte as an intermediate in the production of photographic silver halide emulsions.

It is therefore an object of the invention to provide a process for producing a cryopreserving composition comprising a macromolecular polyampholyte. This process can be used to preserve a variety of different biological materials, e.g. cells and proteins.

The invention also provides certain compositions comprising the macromolecular polyampholyte.

In one embodiment, the invention provides a process for producing a cryopreserving composition comprising biological material, comprising the step:

(a) freezing a biological material at a cryopreserving temperature in a composition comprising a compound of Formula I:

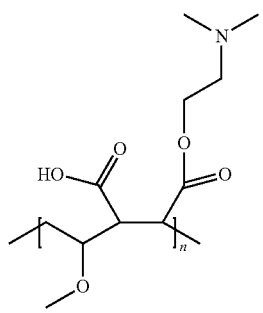

wherein n is 20-5000.

The invention also provides certain cryopreserving compositions comprising a compound of Formula I.

As used herein, the term "cryopreserving composition" refers to a composition which is suitable for the storage of biological material (e.g. cells, tissues, organs and biological molecules) at temperatures below 4° C.

The cryopreserving composition comprises a compound of Formula I.

In the compound of Formula I, n is 20-5000, preferably 100-2000, and more preferably 200-700. In some embodiments, n is preferably 400-600 or 450-550, and most preferably about 500 or 512.

In some embodiments, the compound of Formula I has a number average molecular weight of 100 kDa to 150 kDa, preferably about 125 kDa. In some embodiments, the compound of Formula I has a weight average molecular weight of 200 kDa to 300 kDa, preferably about 250 kDa.

The final concentration of the compound of Formula I in the cryopreserving composition (i.e. including the biological material) will generally be in the range 1-200 mg/ml, e.g. 1-50 mg/ml, 50-100 mg/ml, 100-150 mg/ml or 150-200 mg/ml. In some embodiments, the final concentration of the compound of Formula I in the cryopreserving composition is 10-150 mg/ml, more preferably 25-100 mg/ml. Such concentrations are particularly useful for cryopreserving blood cells. In other embodiments, the final concentration of the compound of Formula I in the cryopreserving composition is 1-100 mg/ml, more preferably 1-40 mg/ml. Such concentrations are particularly useful for cryopreserving nucleated cells. In other embodiments, the final concentration of the compound of Formula I in the cryopreserving composition is about 100 mg/ml.

In some particularly preferred embodiments, the compound of Formula I has a number average molecular weight in the range 100 kDa to 150 kDa and it is used in the cryopreserving composition at a concentration of 50-150 mg/ml. In another particularly-preferred embodiment, the compound of Formula I has a number average molecular weight of about 125 kDa and it is used in the cryopreserving composition at a concentration of about 100 mg/ml.

The cryopreserving composition may additionally comprise one or more of the following: an aqueous buffer (e.g. PBS), an antibiotic, a sugar, an anticoagulant, an antioxidant, a pH indicator, glycerol and DMSO. In most embodiments, the cryopreserving composition is an aqueous composition or substantially an aqueous composition. The aqueous composition may, for example, be a physiologically-acceptable buffer (e.g. PBS).

The cryopreserving composition preferably does not contain haemolytic agents, e.g. agents which induce the lysis of red blood cells.

In some embodiments, the cryopreserving composition of the invention additionally comprises biological material. As used herein, the term "biological material" includes cell-containing biological material and biological molecules. The term includes cells, tissues, whole organs and parts of organs. It also includes proteins and nucleic acids, and complexes between proteins and nucleic acids, and viruses.

In some embodiments, the cryopreserving composition of the invention is in a frozen state, e.g. at a temperature of less than 0° C., more preferably less than −5° C., −20° C. or −60° C.

In some embodiments, the composition may also comprise small amounts of organic solvents such as DMSO or glycerol, but generally in amounts that are insufficient to promote or induce vitrification. In some embodiments, the composition comprises 0-10%, preferably, 0-5% or 0-1% and most preferably 0% glycerol. In other embodiments, the composition comprises 1-15%, preferably, 2-12% or 3-11% and most preferably 5-10% glycerol. In some embodiments, the composition comprises 0-10%, preferably, 0-5% or 0-1% and most preferably 0% organic solvents. In some embodiments, the composition comprises 0-10%, preferably, 0-5% or 0-1% and most preferably 0% DMSO. In other embodiments, the composition comprises 1-15%, preferably, 2-12% or 3-11% and most preferably 5-10% DMSO.

For the cryopreservation of nucleated cells, the composition preferably comprises 2-5% DMSO. For the cryopreservation of blood cells, the composition preferably comprises 0% DMSO. In some embodiments, the composition comprises 0-10%, preferably, 0-5% or 0-1% or 0% trehalose.

In some embodiments, the composition is substantially free of vitrification-inducing agents. A "vitrification-inducing agent" is one which is capable of inducing vitrification in the composition at a cryopreserving temperature, e.g. at −20° C. or at the temperature of liquid nitrogen or dry ice. The presence or absence of vitrification of the composition may be established by differential scanning calorimetry and cryo-microscopy. Examples of vitrification-inducing agents include ethylene glycol, glycerol, DMSO, trehalose, propylene glycol, polyethylene glycol and dextran. In some embodiments, the term "vitrification-inducing agents" includes glass-forming organic solvents, e.g. diols and triols. As used herein, the term "substantially free of vitrification-inducing agents" means that the composition is not capable of forming a non-crystalline glass-phase. In general, vitrification-inducing agents are substantially absent from the composition or no vitrification-inducing agents are added to the composition.

The cryopreserved composition is in a non-vitreous state. As used herein, the term "non-vitreous state" means that the composition is not in a non-crystalline glass state.

The compound of Formula I is readily soluble in aqueous solutions. The cryopreserving compositions of the invention may be made simply by dissolving an appropriate amount of the compound of Formula I in an appropriate buffer (e.g. PBS) and stirring until it is dissolved.

The term "biological material" includes cells. The cells which may be used in the compositions and processes of the invention may be any cells which are suitable for cryopreservation.

The cells may be prokaryotic or eukaryotic cells, preferably eukaryotic cells. The cells may be bacterial cells, fungal cells, plant cells or animal cells. The term "animal cells" includes mammalian cells, and preferably human cells. In some embodiments of the invention, the cells are preferably bacterial cells.

In some embodiments of the invention, the cells are all of the same type. For example, they are all blood cells, brain cells, muscle cells or heart cells.

In other embodiments, the biological material comprises a mixture of one or more types of cell. For example, the biological material may comprise a primary culture of cells, a heterogeneous mixture of cells or spheroids.

In other embodiments, the cells are all from the same lineage, e.g. all haematopoietic precursor cells.

The cells for cryopreservation are generally live or viable cells or substantially all of the cells are live or viable.

In some embodiments, the cells are isolated cells, i.e. the cells are not connected in the form of a tissue or organ.

In some preferred embodiments, the cells are adipocytes, astrocytes, blood cells, blood-derived cells, bone marrow cells, bone osteosarcoma cells, brain astrocytoma cells, breast cancer cells, cardiac myocytes, cerebellar granule cells, chondrocytes, corneal cells, dermal papilla cells, embryonal carcinoma cells, embryo kidney cells, endothelial cells, epithelial cells, erythroleukaemic lymphoblasts, fibroblasts, foetal cells, germinal matrix cells, hepatocytes, intestinal cells, keratocytes, kidney cells, liver cells, lung cells, lymphoblasts, melanocytes, mesangial cells, meningeal cells, mesenchymal stem cells, microglial cells, neural cells, neural stem cells, neuroblastoma cells, oligodendrocytes, oligodendroglioma cells, oocytes, oral keratinocytes, organ culture cells, osteoblasts, ovarian tumour cells, pancreatic beta cells, pericytes, perineurial cells, root sheath cells, schwann cells, skeletal muscle cells, smooth muscle cells, sperm cells, stellate cells, synoviocytes, thyroid carcinoma cells, villous trophoblast cells, yolk sac carcinoma cells, oocytes, sperm or embryoid bodies; or any combination of the above.

In other embodiments, the cells are stem cells, for example, neural stem cells, adult stem cells, iPS cells or embryonic stem cells.

In some preferred embodiments, the cells are blood cells, e.g. red blood cells, white blood cells and/or blood platelets. In some particularly preferred embodiments, the cells are red blood cells which are substantially free from white blood cells and/or blood platelets.

In other particularly-preferred embodiments, the cells are lactic acid bacteria, e.g. *Lactobacillus* or *Lactococcus*. Such bacteria are particularly useful for the manufacture of cheese and yogurt.

In other embodiments, the biological material to be cryopreserved is in the form of a tissue or a whole organ or part of an organ. Examples of tissues include skin grafts, corneas, ova, germinal vesicles, or sections of arteries or veins. Examples of organs include the liver, heart, kidney, lung, spleen, pancreas, or parts or sections thereof. These may be of human or non-human (e.g. non-human mammalian) origin.

In some preferred embodiments, the biological material or cells are selected from semen, sperm, blood cells (e.g. donor blood cells or umbilical cord blood, preferably human), stem cells, tissue samples (e.g. from tumours and histological cross sections), skin grafts, oocytes (e.g. human oocytes), zygotes, embryos (e.g. those that are 2, 4 or 8 cells when frozen), ovarian tissue (preferably human ovarian tissue) or plant seeds or shoots.

The biological material may be living or dead (i.e. non-viable) material.

In general, the biological material will be immersed or submerged in the composition or perfused with the composition such that the composition makes intimate contact with all or substantially all of the biological material.

In some embodiments, the biological material consists of or comprises viruses.

The composition of the invention is also suitable for the cryopreservation of proteins. As used herein, the term "protein" includes polypeptides and peptides, as well as proteins, polypeptides and peptides which are conjugated to non-protein moieties (e.g. antibody-drug conjugates) and protein/nucleic acid complexes. Preferably, the proteins are purified proteins.

Examples of preferred proteins include enzymes, therapeutic proteins, diagnostic proteins and antibodies. Examples of therapeutic proteins include insulin, erythropoetin, and antibodies (e.g. monoclonal antibodies). Examples of diagnostic proteins include thermostable polymerases (e.g. Taq polymerase), CRISPR enzymes (e.g. Cas9, dCas9, Cpf1) and glucose oxidase.

The cryopreserving composition of the invention may be used to store the biological material in a preserved or dormant state (e.g. at its cryopreserving temperature), after which time the biological material may be returned to a temperature above 4° C. for subsequent use.

In general, the cryopreserving composition comprising the biological material will initially be at a temperature above 0° C., e.g. at about 4° C. or at ambient temperature. From there, its temperature will be reduced to the cryopreserving temperature, preferably in a single, essentially uniform step (i.e. without a significant break).

Preferably, the cryopreserving temperature is below 0° C. For example, the cryopreserving temperature may be below −5° C., −10° C., −20° C., −60° C. or in liquid nitrogen or liquid helium, carbon dioxide ('dry-ice'), or slurries of carbon dioxide with other solvents. In some preferred embodiments, the cryopreserving temperature is about −20° C., about −80° C. or about −180° C.

The invention therefore provides a process for producing a cryopreserving composition comprising biological material, comprising the step:
 (a) freezing a biological material at a cryopreserving temperature in a cryopreserving composition as defined herein.

In general, the biological material will be placed in the cryopreserving composition and then the temperature will be reduced. The temperature may be reduced directly to the final cryopreserving temperature or first to an intermediate temperature (which may be above or below the final cryopreserving temperature).

The freezing of the biological material may take place in the cryopreserving composition or before the biological material is contacted with or placed in the cryopreserving composition. In other words, the biological material may be frozen before it is contacted with the cryopreserving composition.

If the biological material comprises tissues or organs and/or parts, these may or may not be submerged, bathed in or perfused with the cryopreserving composition prior to cryopreservation.

Preferably, the cryopreserving composition comprising the biological material is not stirred and/or is not agitated during the freezing step.

The process may additionally comprise the step of storing the biological material at a cryopreserving temperature after freezing.

The cryopreserved biological material may be stored for cell, tissue and/or organ banking. In some embodiments, the cryopreserved composition comprising the biological material is stored in a tissue bank or cell-depository institution.

The cryopreserved material may be stored at the cryopreserving temperature for any desired amount of time. Preferably, it is stored for at least one day, at least one week or at least one year. More preferably, it is stored for 1-50 days, 1-12 months or 1-4 years. In some embodiments, it is stored for less than 5 years.

The process of the invention may additionally comprise the step of transporting the cryopreserving composition comprising the biological material in a frozen or partially-frozen state to a remote location.

The rate of freezing may, for example, be slow (e.g. 1-10° C./minute) or fast (above 10° C./min).

In some embodiments, the rate of freezing is at least 10° C./minute, preferably at least 20° C./minute, at least 50° C./minute or at least 100° C./minute. In some embodiments, the rate of freezing is between 10° C./minute and 1000° C./minute, between 10° C./minute and 500° C./minute, or between 10° C./minute and 100° C./minute.

In some embodiments, the rate of freezing is 0.5-2.0° C. per minute, more preferably about 1° C. per minute. Such a freezing rate is particularly useful for freezing blood cells.

Fast rates of freezing induce the production of ice crystals in the composition. Crystals produced in this way are small; they are also generally numerous.

The most preferred freezing rate in any one particular case will be dependent on the volume of the composition and the nature of the biological material. By following the teachings herein and the above points in particular, the skilled person may readily determine the most appropriate freezing rate in any one case.

Rapid freezing using solid $CO_2$ slurries or liquid $N_2$ are preferred, which cool at approximately 100° C./min. It is also possible to achieve similar rates using other cryogens which have a temperature which is colder than standard refrigerators (e.g. below −20° C.).

In a preferred embodiment, the polymer is present in the composition at a concentration which is insufficient to prevent ice nucleation (ice formation) in the composition. Under such circumstances, ice may form in the composition.

The invention therefore provides a process as described herein, wherein ice is present in the cryopreserving composition at one or more stages during thawing of the composition.

Ice nucleation within the composition may be tested for by differential scanning calorimetry or cryomicroscopy.

The process of the invention may additionally comprise the step of thawing the composition.

In some embodiments, the term "thawing" refers to raising the temperature of the cryopreserved composition or biological material to 0° C. or above, preferably to 4° C. or above.

In other embodiments, the term "thawing" refers to raising the temperature of the cryopreserved composition or biological material to a temperature at which there are no or substantially no ice crystals in all or part of the cryopreserved composition or biological material. Hence the term "thawing" includes complete and partial thawing.

The invention therefore further provides a process for producing a biological material, comprising the steps:
 (a) thawing a cryopreserving composition of the invention comprising biological material; and optionally
 (b) removing and/or isolating the biological material from the cryopreserving composition.

The process may additionally comprise the step of storing the biological material at a temperature of 0-10° C. after thawing.

The rate of thawing may, for example, be slow (e.g. 1-10° C./minute) or fast (above 10° C./min). In some cases it may be advantageous to thaw slowly. Rapid thawing in a water bath at 37° C. is preferred. Cell recovery is also possible at lower temperatures (e.g. 20° C.).

Alternatively, the temperature of the biological material may be raised to a temperature at which the biological material may be removed from or isolated from the cryopreserved composition (e.g. 4° C. or above); and the biological material may then be stored at this temperature until use.

The term "recrystallization" is known in the context of cryopreservation to refer to ice crystal growth during warming or thawing.

After cryopreservation, the biological material may be used for any suitable use, including human and veterinary uses. Such uses include for tissue engineering, gene therapy and cellular implantation.

The invention also provides the use of a compound of Formula I as a cryopreservative, preferably for the cryopreservation of biological materials. The invention also provides the use of a compound of Formula I for the cryopreservation of a biological material.

In other embodiments, the invention provides a cryopreserving composition comprising a compound of Formula I, wherein the concentration of the compound of Formula I is less than 200 mg/ml, preferably less than 190 mg/ml, 180 mg/ml, 170 mg/ml, 160 mg/ml or 150 mg/ml. The final concentration of the compound of Formula I in the cryopreserving composition will generally be in the range 1-150 mg/ml, e.g. 1-50 mg/ml, 50-100 mg/ml, 100-150 mg/ml or 150-180 mg/ml.

In some embodiments, the final concentration of the compound of Formula I in the cryopreserving composition is 10-150 mg/ml, more preferably 25-100 mg/ml; such concentrations are particularly useful for cryopreserving blood cells. Concentrated compositions are also provided comprising 20-200 mg/ml, more preferably 30-200 mg/ml and more preferably 50-200 mg/ml of the compound of Formula I; these can be diluted with the biological material (e.g. cell or protein solution) to achieve the desired concentration of compound of Formula I.

In other embodiments, the final concentration of the compound of Formula I in the cryopreserving composition is 1-100 mg/ml, more preferably 1-40 mg/ml; such concentrations are particularly useful for cryopreserving nucleated cells. Concentrated compositions are also provided comprising 2-200 mg/ml, more preferably 2-80 mg/ml of the compound of Formula I; these can be diluted 1:1 (vol:vol) with the biological material (e.g. cell or protein solution) to achieve the desired concentration of compound of Formula I.

In other embodiments, the concentration of the compound of Formula I in the cryopreserving composition is about 100 mg/ml. A concentration composition of about 200 mg/ml of the compound of Formula I is also provided; this can be diluted 1:1 (vol:vol) with the biological material (e.g. cell or protein solution) to achieve the desired concentration of compound of Formula I.

In some embodiments of the invention, the composition does not comprise both KI and KBr. In other embodiments, the composition does not comprise KI. In other embodiments, the composition does not comprise KBr. In other embodiments, the composition comprises less than 40 mg/ml KBr, preferably less than 20 mg/ml or less than 10 mg/ml KBr, and most preferably less than 1 mg/ml KBr. In some embodiments, the composition comprises less than 0.6 mg/ml, preferably less than 0.4 or 0.2 mg/ml, and most preferably less than 0.1 mg/ml KI.

Also provided is a cryopreserving composition comprising a compound of Formula I in a physiologically-acceptable buffer. Preferably, the pH is 6.5 to 8.0, more preferably the pH is 7.0 to 7.7. Preferably, the buffer is a phosphate-based buffer (e.g. PBS). Preferably, the buffer comprises saline (NaCl).

Also provided is a composition comprising a compound of Formula I and a biological material. In some embodiments, the composition is a frozen composition.

In yet other embodiments, there is provided a kit comprising:
(a) a compound of Formula I; and
(b) one or more additional components selected from an aqueous buffer (e.g. PBS), a sugar, an antibiotic, an anticoagulant, an antioxidant, a pH indicator, glycerol and DMSO (e.g. 2-5%).

The disclosure of each reference set forth herein is specifically incorporated herein by reference in its entirety.

EXAMPLES

The present invention is further illustrated by the following Examples, in which parts and percentages are by weight and degrees are Celsius, unless otherwise stated. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions. Thus, various modifications of the invention in addition to those shown and described herein will be apparent to those skilled in the art from the foregoing description. Such modifications are also intended to fall within the scope of the appended claims.

Example 1

Production of the Polymer from Gantrez SF

Figure 1:
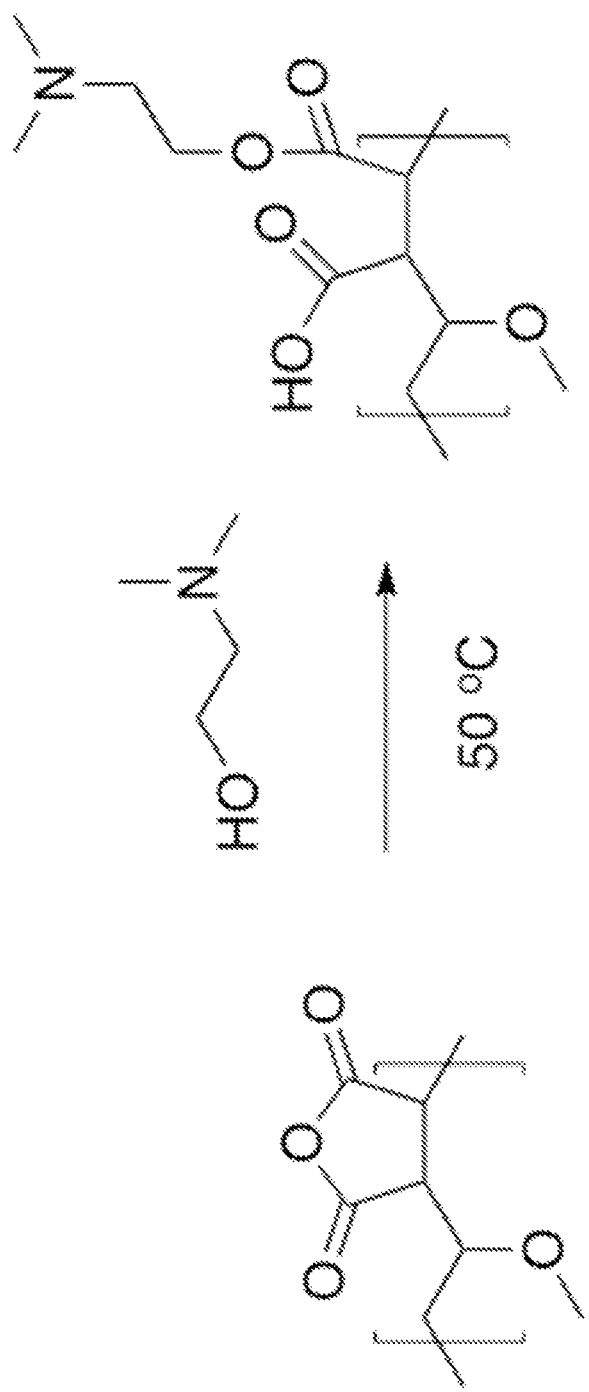
FIG. 1 shows a process for the production of the polymer of Formula I from Gantrez SF.

The polyampholyte polymer used in the following Examples was obtained by reacting poly(maleic-anhydride-alt-methylvinyl ether) (Gantrez SF, $M_n$ 80 kDa, Sigma Aldrich catalogue number 416339) with a hydroxyl-functional tertiary amine, as shown in FIG. 1. (This polyampholyte polymer is referred to below as the "polymer".) In short, the poly(methyl vinyl ether-alt-maleic anhydride) (1 equivalent) was dissolved in THF at 50° C. with stirring. After dissolution was complete, the amine (1.5 equivalents) was added and left for an hour during which time a precipitate formed. Water was then added to make a final 50% solution of water:THF.

Example 2

Cell Recovery After Incubation with the Polymer

Figure 2:
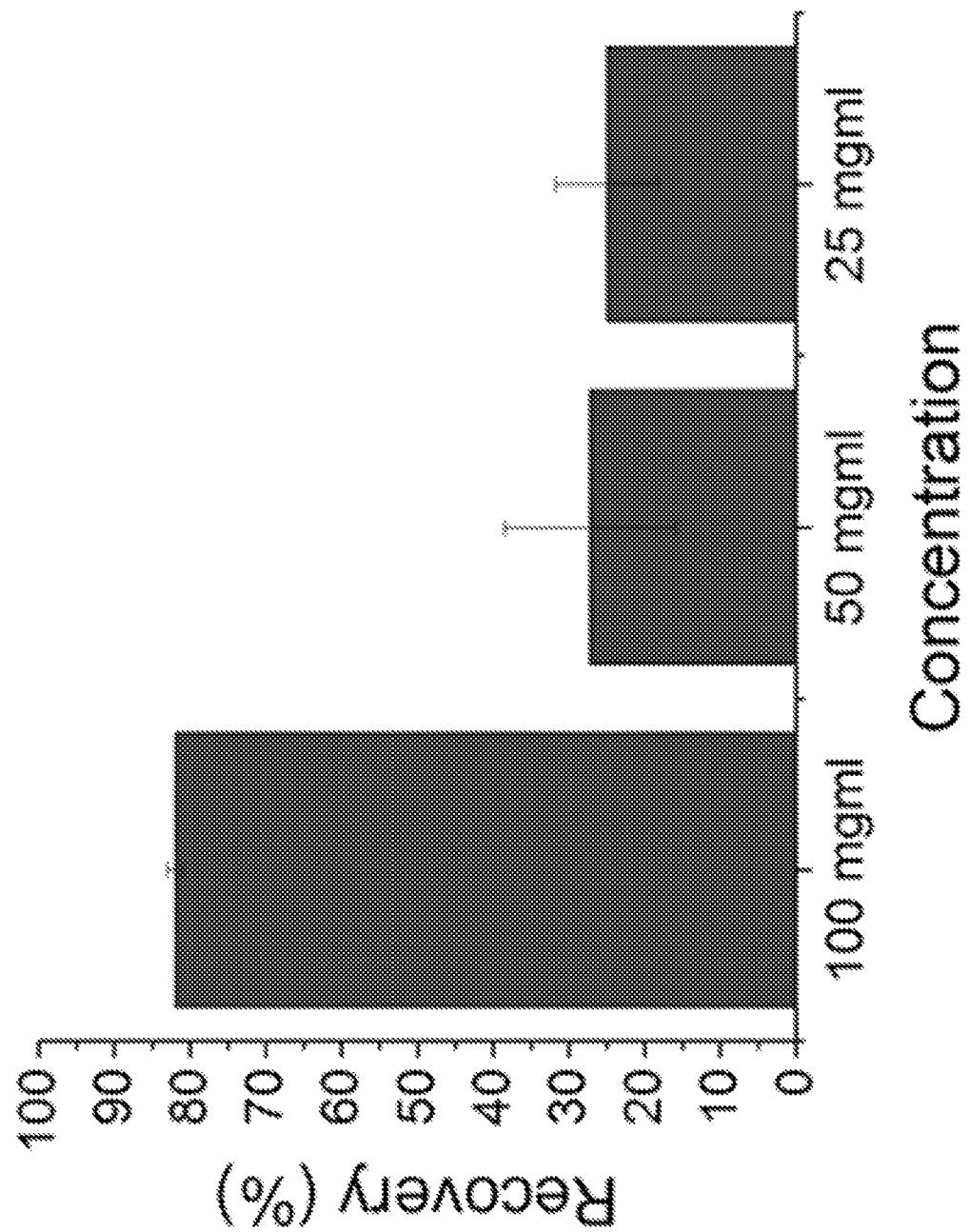
FIG. 2 shows red blood cell recovery (defined as 1/haemolysis) following freezing (liq. $N_2$) and thawing (37° C.) with addition of the polymer of Formula I at the indicated concentration. Errors bars represent the S.D from a minimum of 3 repeats.

The cryopreserving properties of the polymer were evaluated at different concentrations using ovine red blood cells (RBCs). In short, the polymer was mixed with the red blood cells to at 30% packed volume; incubated with the polymer at various concentrations before freezing (in liquid $N_2$); storage; and then thawing at the indicated temperature. Haemolysis (as an indicator of cell death) was measured by measuring the release of haemoglobin using a standard ADH assay. FIG. 2 shows that 100 mg/mL of the polymer was optimal, giving >80% cell recovery.

This is comparable to what is achieved with glycerolization, a labour-intensive process requiring up to 40 wt % cryoprotectants. This represents a significantly-enhanced cryoprotective effect comparable to the current best systems, but without any solvents.

Example 3

Figure 3:
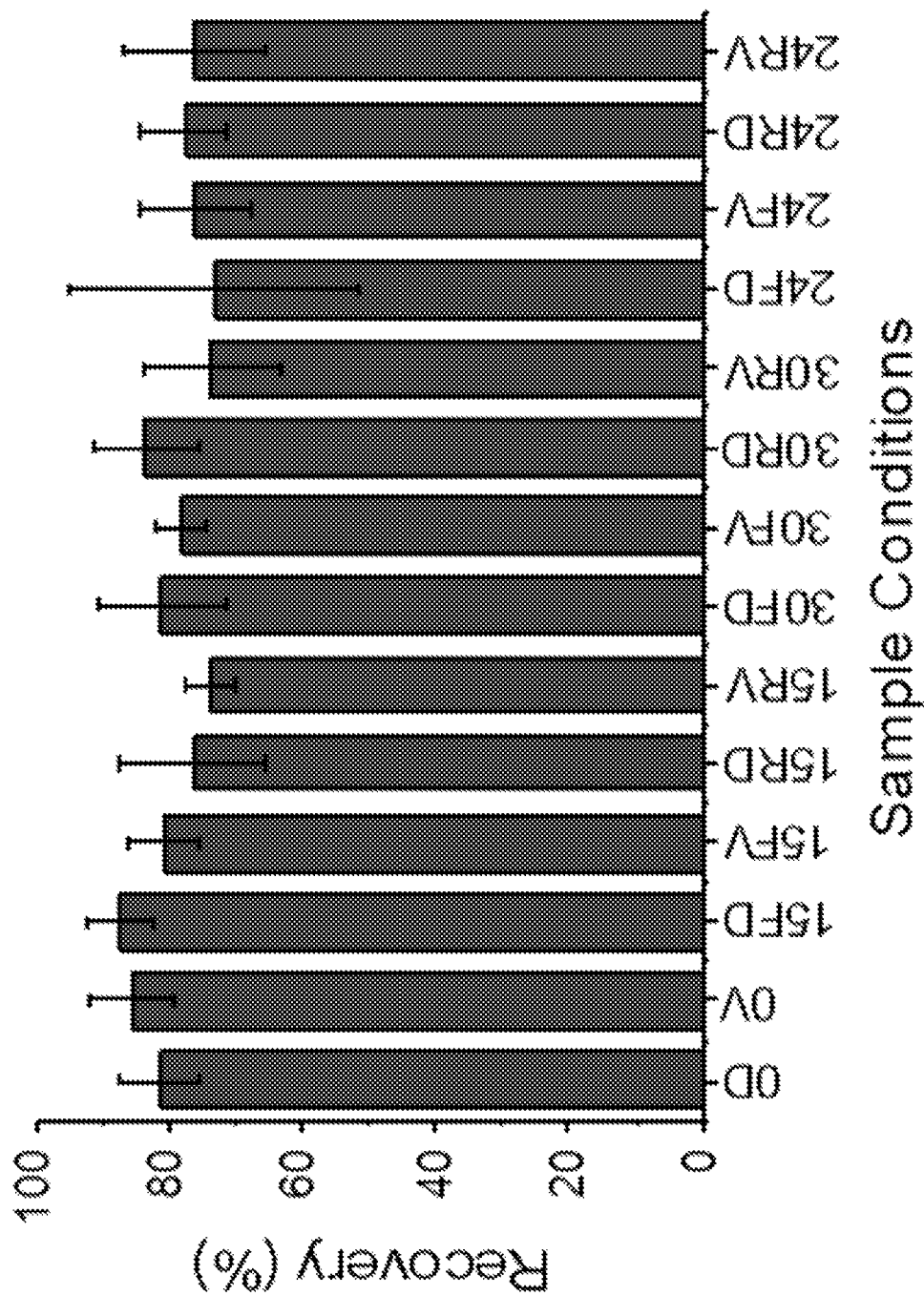
FIG. 3 shows red blood cell recovery with different incubation times. Samples are labelled as: Incubation time (0, 15 minute, 30 minute or 24 hour), Incubation conditions (Fridge (F) or Room temperature (R), Freezing conditions (Vapour (V) or Directly submerged in liquid nitrogen (D)).

Effect of Incubation Time and Temperature on Cell Recovery After Incubation with the Polymer To evaluate the role of incubation time and temperature, RBCs were incubated for a range of conditions ranging from 0, 30 minutes and 24 hours pre-incubation at room temperature and in the fridge. As can be seen in FIG. 3, all conditions gave near-identical results showing this a robust method for cryopreservation of red blood cells.

Example 4

Fragility of Cells After Incubation with the Polymer

Figure 4:
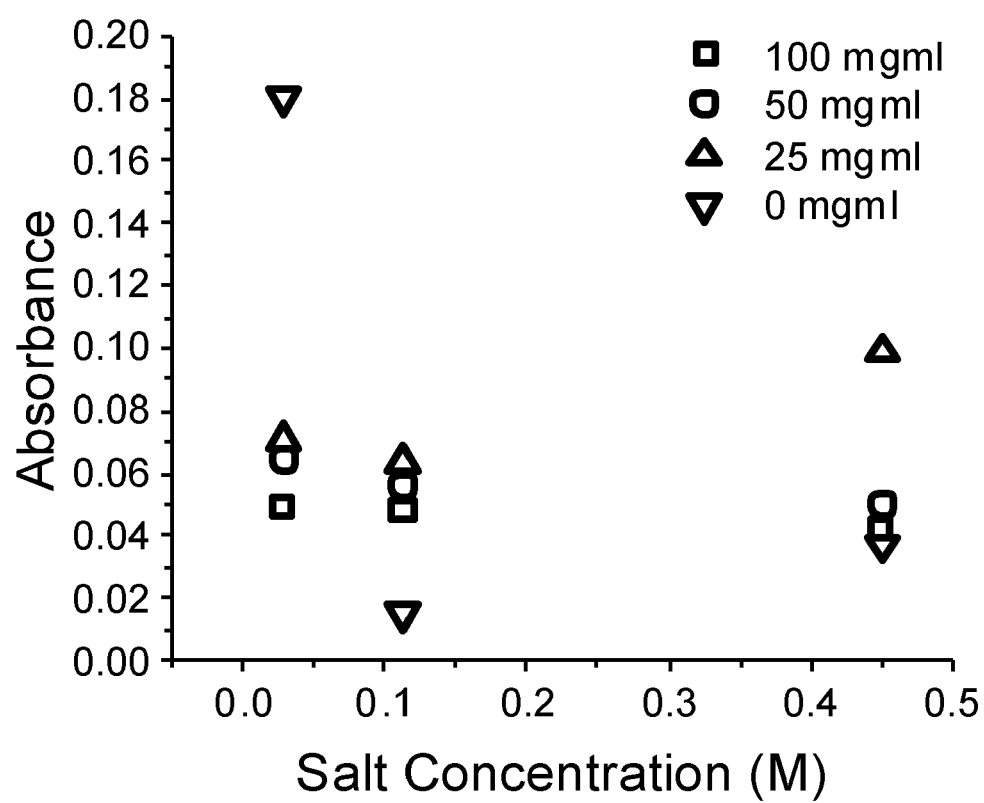
FIG. 4 shows osmotic fragility. As the polymer concentration was decreased, the cells were less tolerant to changes in salt concentration resulting in greater lysis.

As a measure of the quality for the recovery of blood cells, osmotic fragility assays were undertaken (FIG. 4). In short, intact red blood cells were isolated post-freeze/thaw by centrifugation. They were then exposed to a gradient of saline concentrations and haemolysis measured. Fragile cells (due to cryo-damage) would be expected to leak haemoglobin at low concentrations. Cells stored in 25 mg/mL of the polymer haemolysed more and at lower saline concentrations than cells cryopreserved with 100 mg/mL of the polymer confirming this is the optimum formulation for recovery.

Example 5

Monolayer Freezing of Nucleated Adherent Cells

A nucleated adherent cell line was investigated as a more complex cryopreservation challenge. Monolayer freezing is significantly more challenging than in suspension, but is more desirable for nearly all regenerative medicine, biotechnology and basic research applications.

Figure 5:
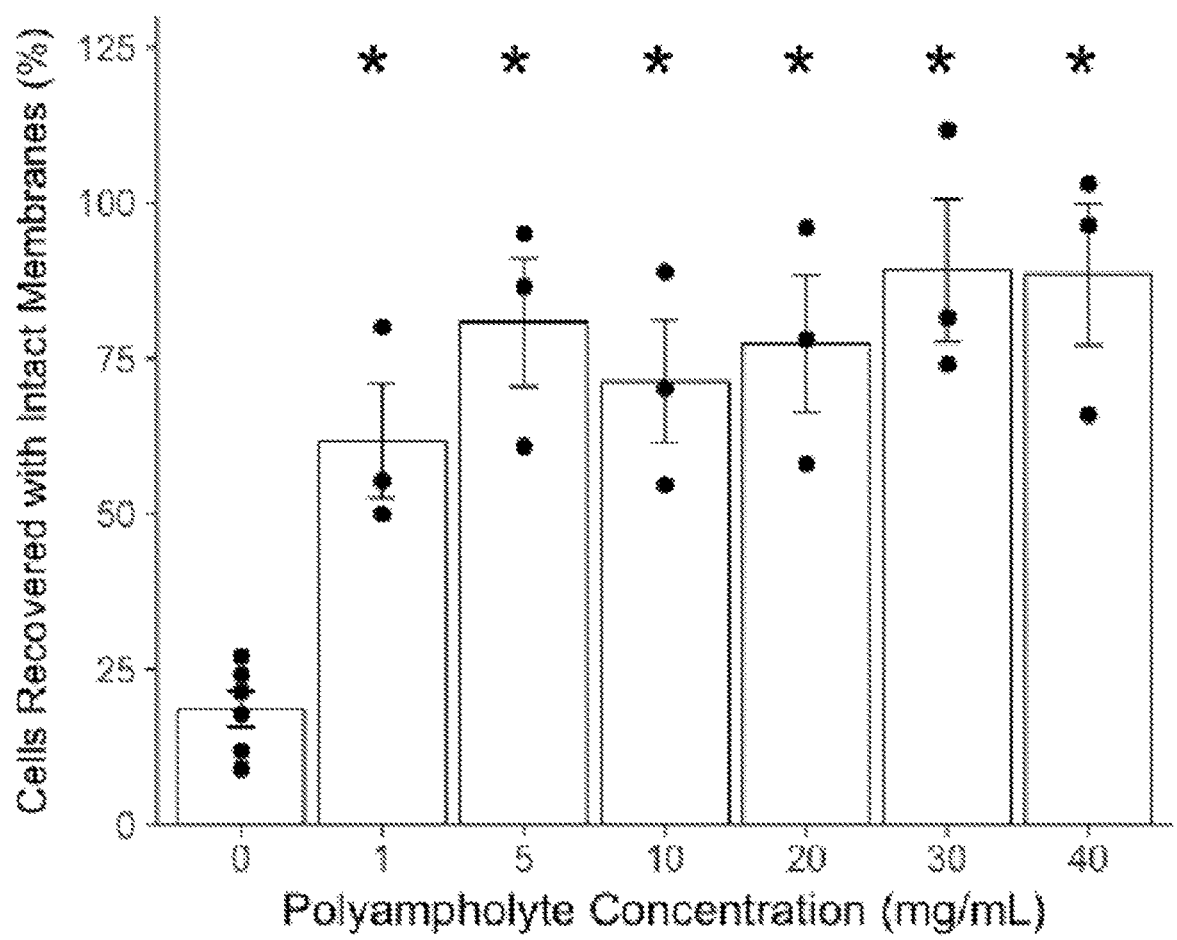
FIG. 5 shows the effect of the polymer on recovery of A549 cells with intact membranes after freezing at −80° C. for 24 hours. Cells were incubated for 24 hours prior to freezing. Recovered cells with intact membranes were evaluated 24 hours after thawing via trypan blue exclusion assay. The data represent the mean±SEM of 3 independent experiments with 2 nested replicates each (*P<0.05 compared to control with 10% DMSO treatment).

Monolayers of A549 (epithelial lung carcinoma) cells were cultured to confluence, and then exposed to 10 wt % DMSO containing variable concentrations of the polymer. This solution was only exposed to the cells for 10 minutes, before all excess was removed, and the cells were frozen at 1° C./min to −80° C. After 24 hours, the cells were thawed at 37° C. by the addition of warmed cell culture media and allowed to recover for 24 hours. After this time total cell viability was assess by trypan blue staining. The results are shown in FIG. 5.

Compared to DMSO alone, addition of 40 mg/mL (~4 wt %) of the polymer resulted in a dramatic increase in recovered cells from 20% to 89%, with several repeats giving near quantitative cell recovery. This is a significant increase and uses significantly less solvent than previous processes. The conditions chosen were non-vitrifying, as the solvent content and slow freezing mean ice must form.

Example 6

Effect of DMSO Concentration on Cell Recovery After Incubation with the Polymer

Figure 6:
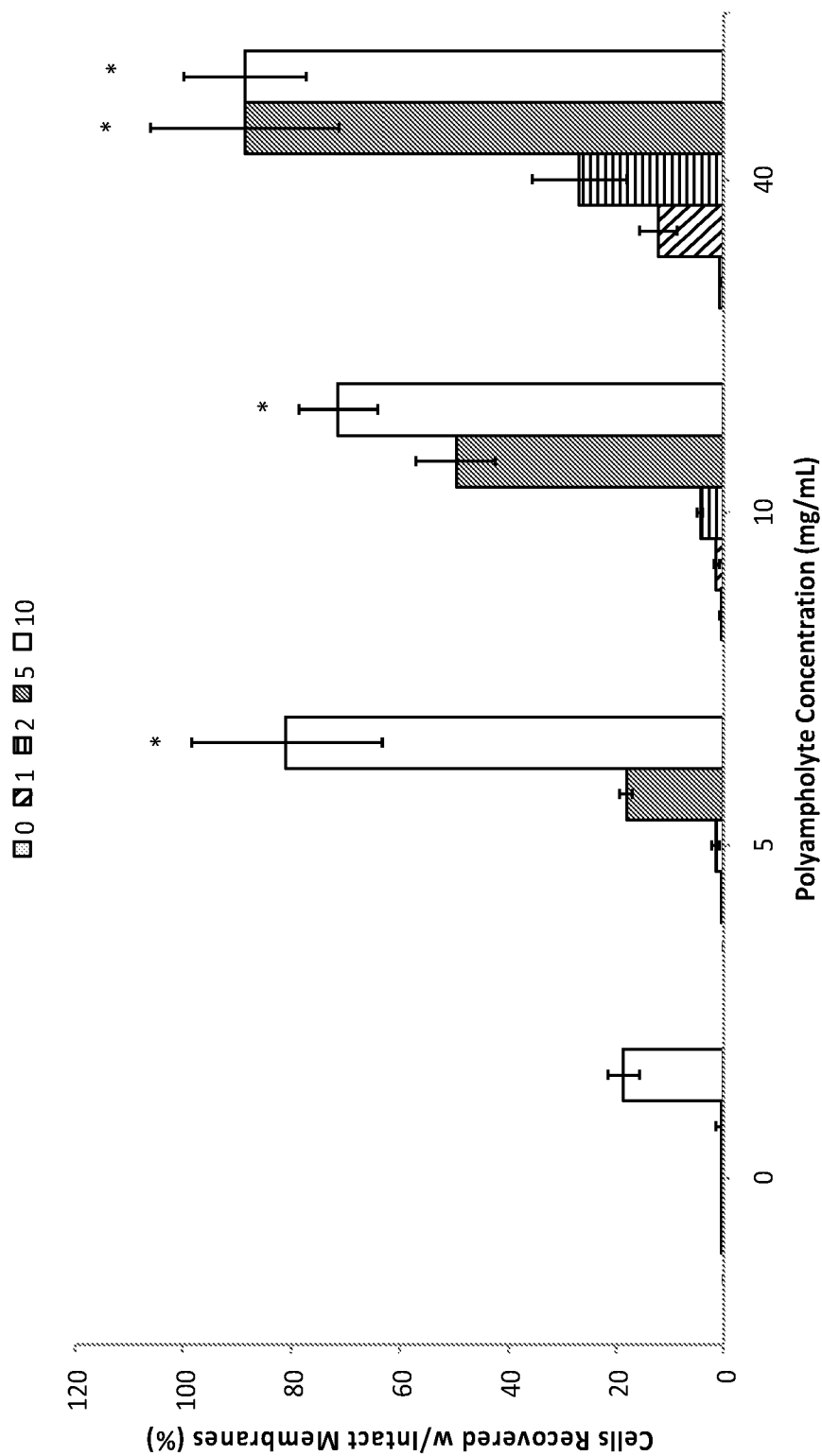
FIG. 6 shows the effect of the polymer and DMSO concentration on recovery of A549 cells with intact membranes after freezing at −80° C. for 24 hours. Cells were incubated for 24 hours prior to freezing. Recovered cells with intact membranes were evaluated 24 hours after thawing via trypan blue exclusion assay. The data represent the mean±SEM of 3 independent experiments with 2 nested replicates each (*P<0.05 compared to control with 10% DMSO treatment).

The impact of lowering the DMSO concentration was investigated using the same procedure as given in Example 5. For the highest concentration of the polymer, it was possible to reduce the DMSO concentration to just 5 wt % (see FIG. 6), whilst retaining the same level of cell recovery as 10% DMSO. Lower concentrations of DMSO were also tolerated, but gave significantly lower cell recoveries. This shows that not only does the polymer enhance cell recovery compared to previous cryopreservation processes, but it also enables significant reduction in DMSO (which is an undesirable cryopreservant due to potential toxicity and its propensity to cross biological barriers).

Example 7

Suspension Cryopreservation Using Poly(ampholyte)

Figure 7:
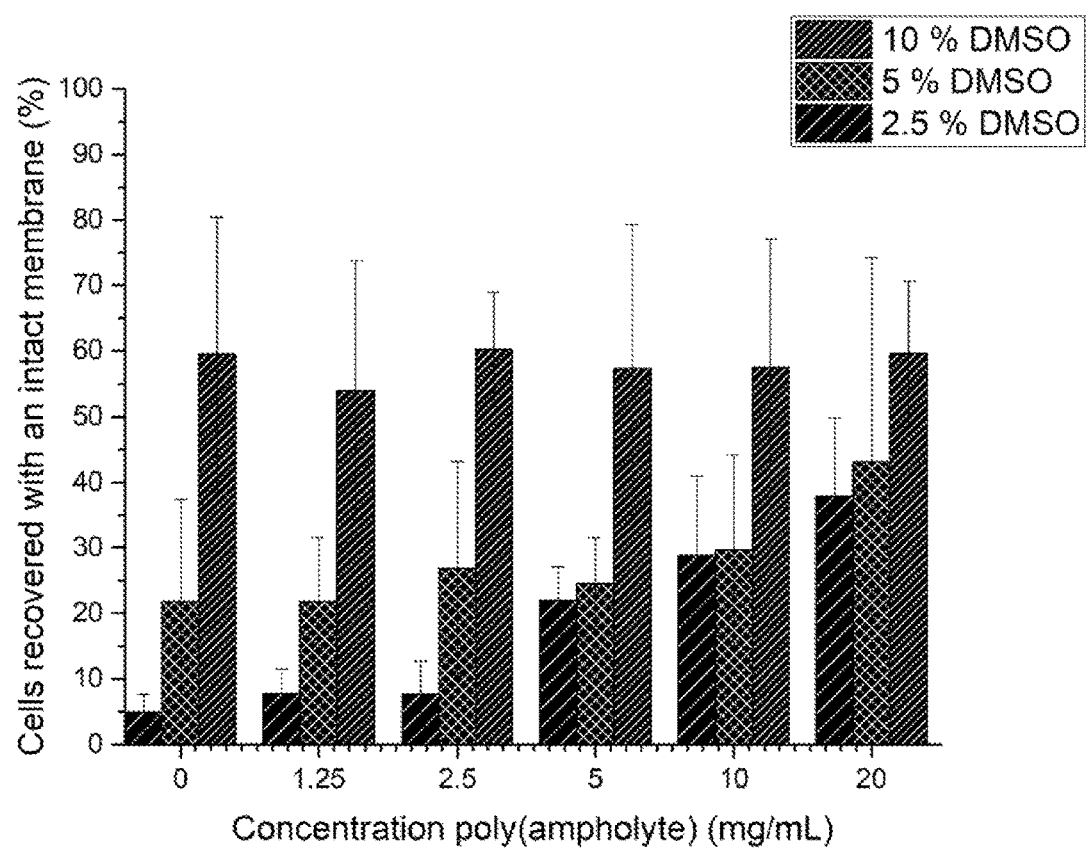
FIG. 7. A549 suspension cell cryopreservation results. Cell recovery is reported as a function of polymer and DMSO concentration.

A549 cells were cryopreserved in suspension format with the indicated concentration of DMSO and polymer to ascertain the impact of the polymer concentration on cell recovery. Cells were cryopreserved using the indicated concentration of DMSO and polymer, by slow freezing to −80° C. at 1° C./min, then storage in liquid $N_2$ for 24 hours. Following thawing at 37° C., cells were added to complete media and centrifuged to pellet the cells. The supernatant was discarded and the pellet was disrupted, then resuspended in complete cell media. Cells were plated into individual wells of a 24 well plate and incubated in a humidified atmosphere for 24 hours. After 24 hours, the supernatant was removed and the cells were trypsinised. Following trypsin treatment, the cell suspension was diluted with media and counted using the trypan blue exclusion assay to determine the number of cells present with intact membranes. The results are shown in FIG. 7, thus demonstrating that the method is additionally useful for suspended cells.

Example 8

Effect of the Polymer on Further Cell Lines

Figure 8:
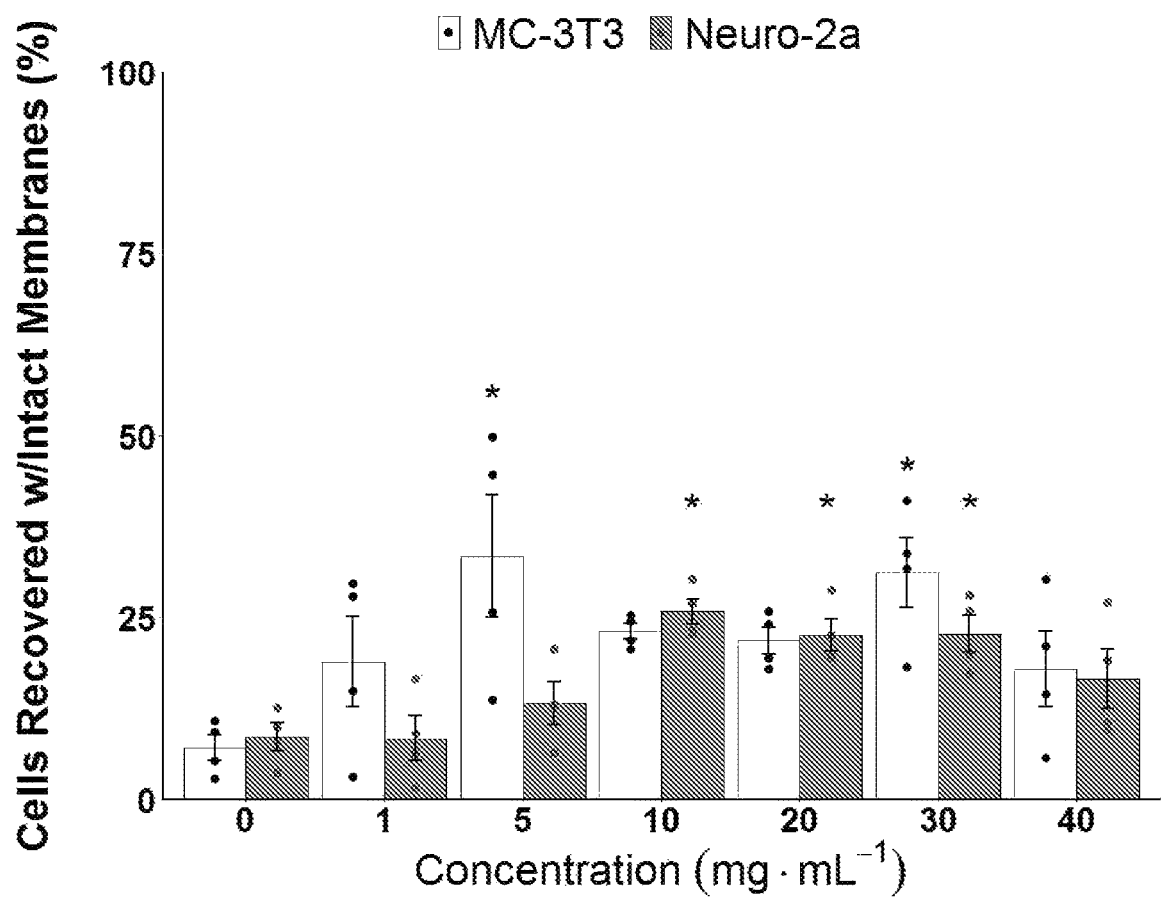
FIG. 8. Cells recovered with intact membranes after cryopreservation using 10% DMSO and the indicated polymer concentration.

MC-3T3 and Neuro-2a cell were cryopreserved in the monolayer format to ascertain the effect of polymer concentration of cell recovery. These cells were chosen as they give lower recoveries in monolayer format using standard DMSO cryopreservation compared to A549. Conditions were the same as for A549 cells and viability was measured by counting intact cells (determined by trypan blue staining). Cell recoveries were >3 fold higher compared to 10% DMSO alone. The results are shown in FIG. 8

Example 9

Cytotoxicity of the Polymer

Figure 9:
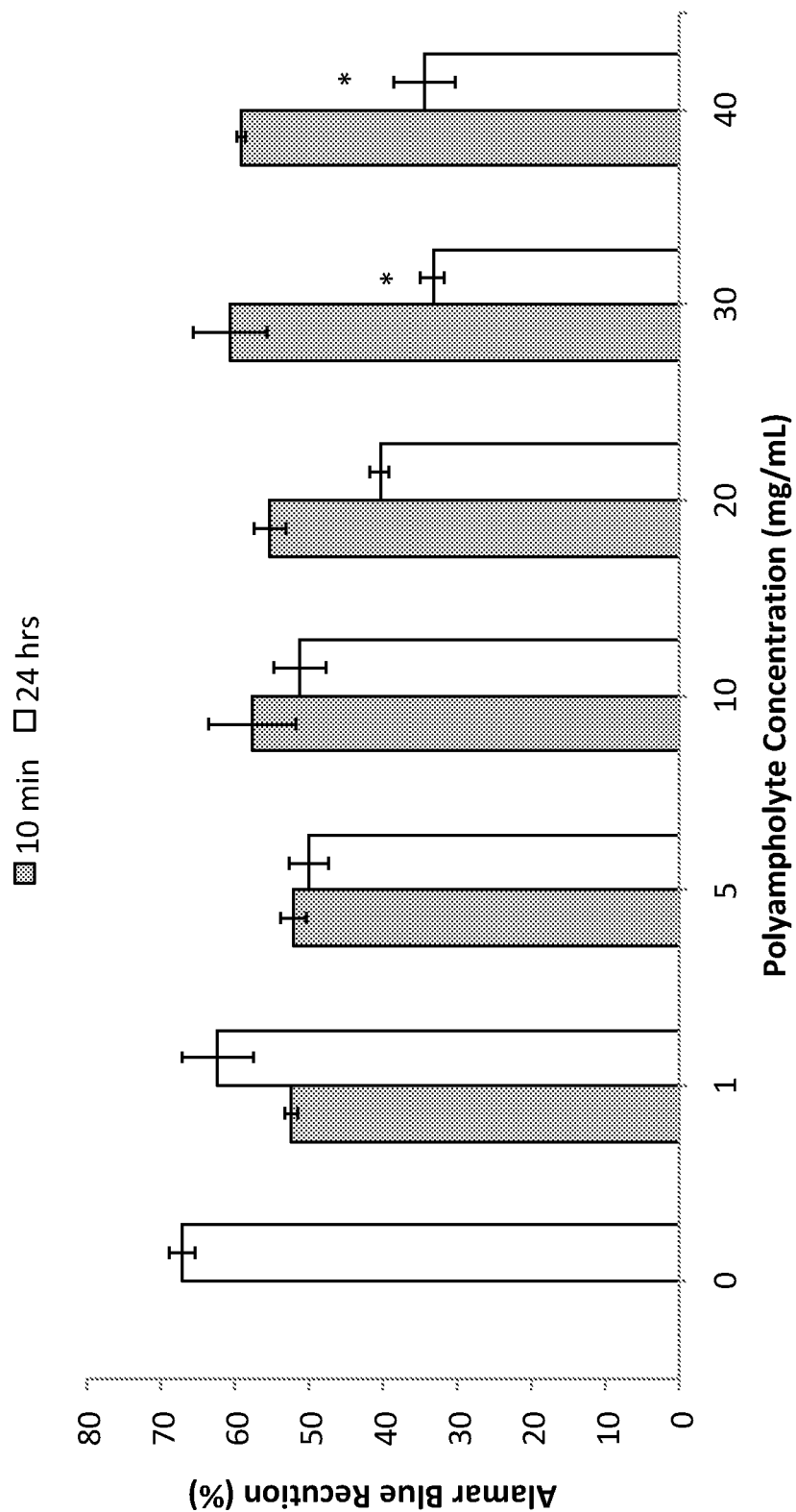
FIG. 9 shows the toxicity of the polymer on A549 cells. Alamar blue reduction following incubation with the polymer for 10 minutes and 24 hours. Cells were incubated for 10 minutes or 24 hours in indicated concentrations of the polymer. Alamar blue reduction was measured 24 hours after incubation with the polymer. The data represent the mean±SEM of 3 independent experiments (*P<0.005 compared to control).
Figure 10:
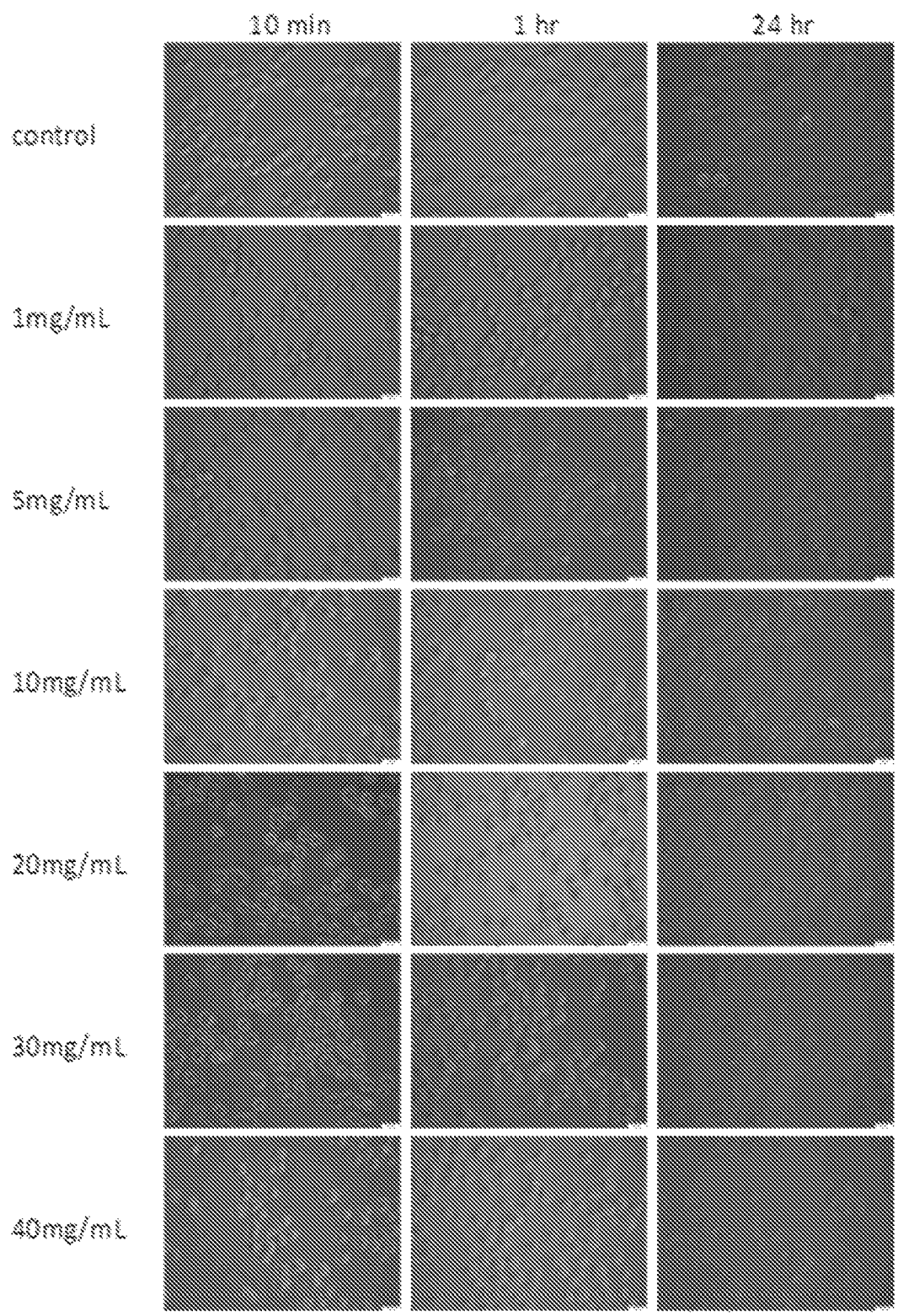
FIG. 10 shows a bright field image of A549 cell morphology analysis as function of concentration of the polymer and time.

The cytotoxicity of the polymers and DMSO mixtures towards A549 cells was evaluated. Cells were incubated with 10% DMSO or a dilution series of the polymer for either 10 minutes (to represent the conditions used in cryopreservation) or for 24 hours to exaggerate any effects. After 10 minutes, the conditions led to no effect on cell viability (FIGS. 9 and 10). This highlights the benefit of this method where the surplus cryoprotectants are removed before freezing, and then diluted by the thawing strategy of adding warm media. 24 hour toxicity testing showed a small reduction in cell number in the highest concentrations of the polymer, but this was significantly less toxic than what is seen for DMSO (which is the gold standard cell cryoprotectant). Morphological analyses of the cells also confirmed these observations, with short exposure times showing no adverse effects, but 24 hours of incubation at high concentration affecting morphology.

It should be noted that this does not affect the use of these cryoprotectants as the cells exposed are not exposed to these concentrations for more than 10 minutes, and potentially at concentrations well below 1 mg/mL upon dilute (thawing) where no toxicity is seen.

Example 10

Comparative Solubility of Various Polyampholytes

To be of practical use, a polyampholyte cryopreservative needs to be capable of a high degree of solubility in order to be able to produce concentrated solutions for those biological materials which are best preserved using such solutions.

The solubilities and activities of a range of polyampholytes were tested.

Ice recrystallisation inhibition activity was determined by the splat assay. This involved seeding a large number of small ice crystals, which were annealed for 30 min at −8° C. before being photographed on a microscope. The average crystal size was measured relative to a PBS control and can be reported as (a) the Mean Grain Size (MGS), which is the average size of the grains in the field of view, relative to a PBS control ice wafer; or as (b) the Mean Largest Grain Size (MLGS), which is the average length of the largest crystal in the field of view.

Solubility was defined as the upper concentration where a non-turbid solution of the polymer in PBS could be obtained at room temperature.

The results are given below.

| Reference | Structure | IRI Activity | Solubility |
|---|---|---|---|
| Polymer of the invention | 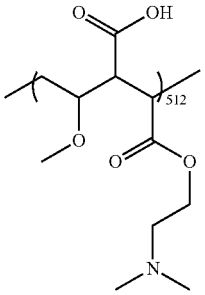 | 70% MGS at 20 mg/ml | Soluble up to 200 mg/ml |

-continued
| Reference | Structure | IRI Activity | Solubility |
|---|---|---|---|
| Chem. Commun., 2015, 51, 12977 | 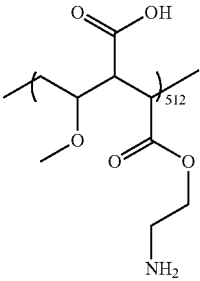 | 50% MLGS at 20 mg/ml 20 mg/ml + HES gave 60% RBC recovery | Soluble up to 100 mg/ml |
| Biomacromolecules 2017, 18, 295 | 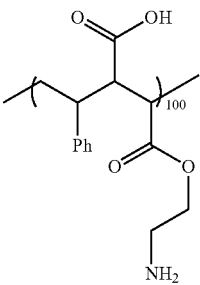 | 32% MGS at 20 mg/ml | 20 mg/ml solution was turgid, therefore not very soluble |
|  | 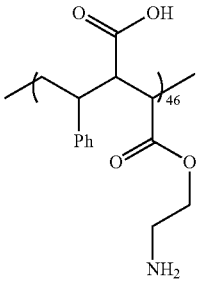 | Could not be tested | Insoluble |
|  | 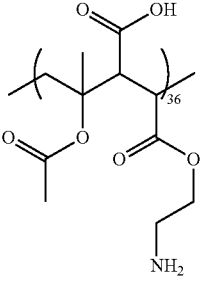 | 55% MGS at 20 mg/ml | Soluble up to 20 mg/ml |
|  | 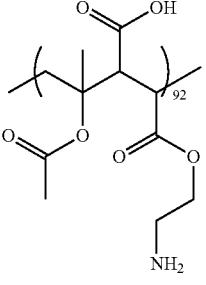 | 44% MGS at 20 mg/ml | Soluble up to 20 mg/ml |

-continued

| Reference | Structure | IRI Activity | Solubility |
|---|---|---|---|
|  |  | 42% MGS at 20 mg/ml | Soluble up to 20 mg/ml |
|  |  | 58% MGS at 20 mg/ml | Soluble up to 20 mg/ml |
|  |  | 16% MGS at 20 mg/ml | Soluble up to 20 mg/ml |
|  |  | 55% MGS at 20 mg/ml | Soluble up to 20 mg/ml |
|  |  | 47% MGS at 20 mg/ml | Soluble up to 20 mg/ml |

-continued

| Reference | Structure | IRI Activity | Solubility |
|---|---|---|---|
| | (copolymer structure, n=92) | 46% MGS at 20 mg/ml | Soluble up to 20 mg/ml |
| | (copolymer structure, n=30) | 47% MGS at 20 mg/ml | Soluble up to 20 mg/ml |
| | (copolymer structure, n=57) | 60% MGS at 20 mg/ml | Soluble up to 20 mg/ml |
| | (copolymer structure, n=92, diisopropylamino) | 55% MGS at 20 mg/ml | Not particularly soluble at 20 mg/ml, semi-turgid solution. |

No dependence of the activity of the polymers on molecular weight was observed.

Whilst activity for some of the above polymers was observed, this was on the edge of their solubilities. Therefore, their activity could be merely a result of an increase in viscosity.

Example 11

Toxicity of Polyampholytes Towards Red Blood Cells

Ovine red blood cells were exposed to poly(ampholytes) for 4 hours and the total haemolysis was measured.

| Reference | Structure | Activity |
|---|---|---|
| Polymer of the invention | | 9% haemolysis at 100 mg/mL (i.e. 91% of cells intact). |
| Chem. Commun., 2015, 51, 12977 | | 82% haemolysis at 100 mg/mL (i.e. 18% of cells remained intact). |

This example illustrates the fact that a small change in the functionalisation of the amine group (from $NH_2$ to $N(CH_3)_2$) makes this polyampholyte significantly less toxic.

The invention claimed is:

1. A process for producing a cryopreserved composition comprising biological material, the process comprising the step:
    (a) freezing biological material at a cryopreserving temperature in a cryopreserving composition comprising a compound of Formula I:

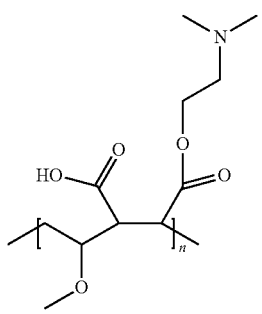

wherein n is 20-5000, wherein the biological material is selected from the group consisting of cells, monolayers of cells and spheroids.

2. The process as claimed in claim 1, wherein n is 400-600.

3. The process as claimed in claim 1, wherein the final concentration of the compound of Formula I in the cryopreserving composition is 1-200 mg/ml, 1-40 mg/ml, or 25-150 mg/ml.

4. The process as claimed in claim 1, wherein the cryopreserving composition additionally comprises one or more components selected from the group consisting of an aqueous buffer, an antibiotic, a sugar, an anticoagulant, an antioxidant, a pH indicator, glycerol and DMSO.

5. The process as claimed in claim 4, wherein the cryopreserving composition comprises 2-5% DMSO.

6. The process as claimed in claim 1, wherein the cells are red blood cells or nucleated cells.

7. A process for producing a biological material, the process comprising the steps:
    (a) thawing a frozen cryopreserving composition comprising a compound of Formula I as defined in claim 1 and biological material, wherein the biological material is selected from the group consisting of cells, monolayers of cells and spheroids; and optionally
    (b) removing and/or isolating the biological material from the thawed composition.

8. A cryopreserving composition comprising a compound of Formula I,

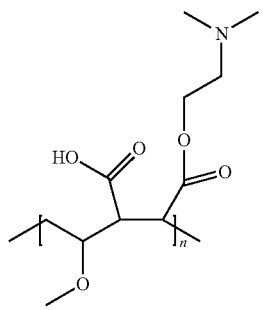

wherein n is 20-5000, wherein the concentration of the compound of Formula I in the composition is 1-15 mg/ml, 25-150 mg/ml, 50-200 mg/ml, 75-150 mg/ml, or about 100 mg/ml.

9. The cryopreserving composition as claimed in claim 8, wherein the composition does not comprise both KI and KBr.

10. The cryopreserving composition as claimed in claim 8, wherein the composition additionally comprises biological material, wherein the biological material is selected from the group consisting of cells, monolayers of cells and spheroids.

11. A cryopreserving composition comprising a compound of Formula I

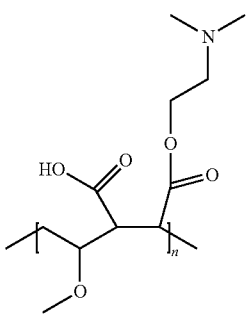

wherein n is 20-5000,
wherein the cryopreserving composition additionally comprises:
(a) a physiologically-acceptable buffer; or
(b) biological material, wherein the biological material is selected from the group consisting of cells, monolayers of cells and spheroids.

12. The cryopreserving composition as claimed in claim 11, wherein the cryopreserving composition is in a frozen state.

13. A kit comprising:
(a) a compound of Formula I,

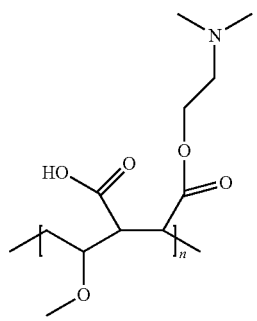

wherein n is 20-5000,
together with
(b) one or more components selected from the group consisting of an aqueous buffer, an antibiotic, a sugar, an anticoagulant, an antioxidant, a pH indicator, glycerol and DMSO.

* * * * *